(12) United States Patent
Mary et al.

(10) Patent No.: US 11,907,202 B2
(45) Date of Patent: Feb. 20, 2024

(54) SESSION STATE DATA DISTRIBUTION VIA CLIENT DEVICES

(71) Applicant: WarnerMedia Direct, LLC, New York, NY (US)

(72) Inventors: Hazel Diana Mary, East Norriton, PA (US); Erik Fortune, Redmond, WA (US); Adam Gilman, Älta (SE); Franklyn Hu, Seattle, WA (US)

(73) Assignee: WARNERMEDIA DIRECT, LLC, New York, NY (US)

( * ) Notice: Subject to any disclaimer, the term of this patent is extended or adjusted under 35 U.S.C. 154(b) by 0 days.

(21) Appl. No.: 17/653,448

(22) Filed: Mar. 3, 2022

(65) Prior Publication Data

US 2023/0281184 A1    Sep. 7, 2023

(51) Int. Cl.
*G06F 16/23* (2019.01)
*G06F 21/60* (2013.01)

(52) U.S. Cl.
CPC ........ *G06F 16/2365* (2019.01); *G06F 21/602* (2013.01)

(58) Field of Classification Search
CPC ............... G06F 16/2365; G06F 21/602; G06F 16/9574; H04L 67/02; H04L 67/142; H04L 63/123
See application file for complete search history.

(56) References Cited

U.S. PATENT DOCUMENTS

| 9,165,124 | B1 | 10/2015 | Gurevich et al. |
| 10,020,936 | B1 | 7/2018 | Ghetti et al. |
| 10,122,682 | B1 | 11/2018 | Salour et al. |
| 2004/0202327 | A1* | 10/2004 | Little ...................... H04L 51/42 380/270 |
| 2014/0164584 | A1 | 6/2014 | Joe et al. |
| 2015/0113172 | A1 | 4/2015 | Johnson et al. |
| 2015/0113647 | A1 | 4/2015 | Sakamaki et al. |

(Continued)

FOREIGN PATENT DOCUMENTS

| CN | 113746882 A | 12/2021 |
| EP | 3 739 848 A1 | 11/2020 |
| WO | 2020/193555 A1 | 10/2020 |

OTHER PUBLICATIONS

Alexandra, What are Microservices? Code Examples, Best Practices, Tutorials and More, pp. 1-3. (Year: 2019).*

(Continued)

*Primary Examiner* — Albert M Phillips, III
(74) *Attorney, Agent, or Firm* — Amin, Turocy & Watson, LLP

(57) ABSTRACT

The described technology is generally directed towards caching session state data on a client device, so that services called by the client device and other services can use the session state data without having to recollect such information from a server or servers that maintain the ground truth values for the session state data. The session state data can be divided into payload datasets based on domains or the like, so that only a relevant part of the session state data need be attached to a given communication, and/or updated when a session variable changes in some way. A payload dataset can be encoded or encrypted so that a service can verify the integrity of the payload dataset before using it, such as for service-to-service communication.

20 Claims, 11 Drawing Sheets

(56) References Cited

U.S. PATENT DOCUMENTS

| | | |
|---|---|---|
| 2015/0334049 A1 | 11/2015 | Miura |
| 2016/0099924 A1 | 4/2016 | Mehta et al. |
| 2016/0099941 A1 | 4/2016 | Hein |
| 2017/0104842 A1 | 4/2017 | Busayarat et al. |
| 2019/0028552 A1 | 1/2019 | Johnson et al. |
| 2020/0244605 A1 | 7/2020 | Nagaraja et al. |
| 2020/0359210 A1 | 11/2020 | Akkad et al. |
| 2020/0366574 A1 | 11/2020 | Schubert et al. |
| 2020/0403911 A1 | 12/2020 | Singhal et al. |
| 2021/0034760 A1* | 2/2021 | Banga .................. G06F 21/602 |
| 2021/0329096 A1 | 10/2021 | Reddem |
| 2023/0185443 A1 | 6/2023 | Yao et al. |

OTHER PUBLICATIONS

International Search Report and Written Opinion received for International Application No. PCT/US2023/014391 dated May 24, 2023, 13 pages.

International Search Report and Written Opinion received for International Application No. PCT/US2023/014388 dated Jun. 15, 2023, 11 pages.

Anonymous: "CDN: How is it Possible that My DNS Delivers a Different IP Depending on the Visitors Location?", Oct. 7, 2021, XP093045374, Retrieved from the Internet: URL:https://serverfault.com/questions/835660/cdn-how-is-it-possible-that-my-dns-delivers-a-different-ip-depending-on-the-vis [retrieved on Nov. 7, 2023] the whole document, 5 pages.

Contavalli et al., "Client Subnet in DNS Queries", Internet Engineering Task Force (IETF), Request for Comments: 7871 W. ISSN: 2070-1721, Google, May 2016, 30 pages.

Notice of Allowance received for U.S. Appl. No. 17/686,328, dated Oct. 25, 2023, 73 pages.

Non-Final Office Action received for U.S. Appl. No. 17/686,328, dated Mar. 27, 2023, 83 pages.

* cited by examiner

SESSION STATE DATA DISTRIBUTION VIA CLIENT DEVICES

BACKGROUND

Users of a service, such as a streaming video platform, use data to form a session state that determines the user's experience during a session. Such datasets can include user data, content, entitlements, language settings, and so forth. In order to improve operational characteristics such as read/write latency, throughput, replication costs, and the like, each of these datasets are physically or logically partitioned, such as among multiple sources and domains, possibly using different parameters. Partitioning is also done for legal or regulatory reasons.

For session state information, including data dependent on logical partitions, a typical implementation is to use server side caching mechanisms like cookies, where the client is usually stateless and the server maintains the session state. The server sends a cookie to the client with the session state and the client attaches the cookie to the next request to that server. This has drawbacks, as cookies are domain specific, and the server needs to recreate the desired state on every client request, or implement a complex caching solution to hold client state. Another type of server side caching is to use a directory that can be used to lookup the partition applicable to a specific request, and route the requests directly to that partition.

An alternate solution is based on global replication of all the data needed to process the requests in all regions. To have consistency of the data among the global replicas, any locally written data is replicated globally. In general, such consistency is eventual rather than instant, otherwise the user-perceived latency with respect to any written data would be significantly increased. However, the computing cost for such replication is significant. Further, replication of some types of data is likely against the rules of some regulatory environments, such as environments under the European Union's General Data Protection Regulation (GDPR) or the Brazilian General Data Protection Law (abbreviated LGPD based on its Portuguese language name).

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
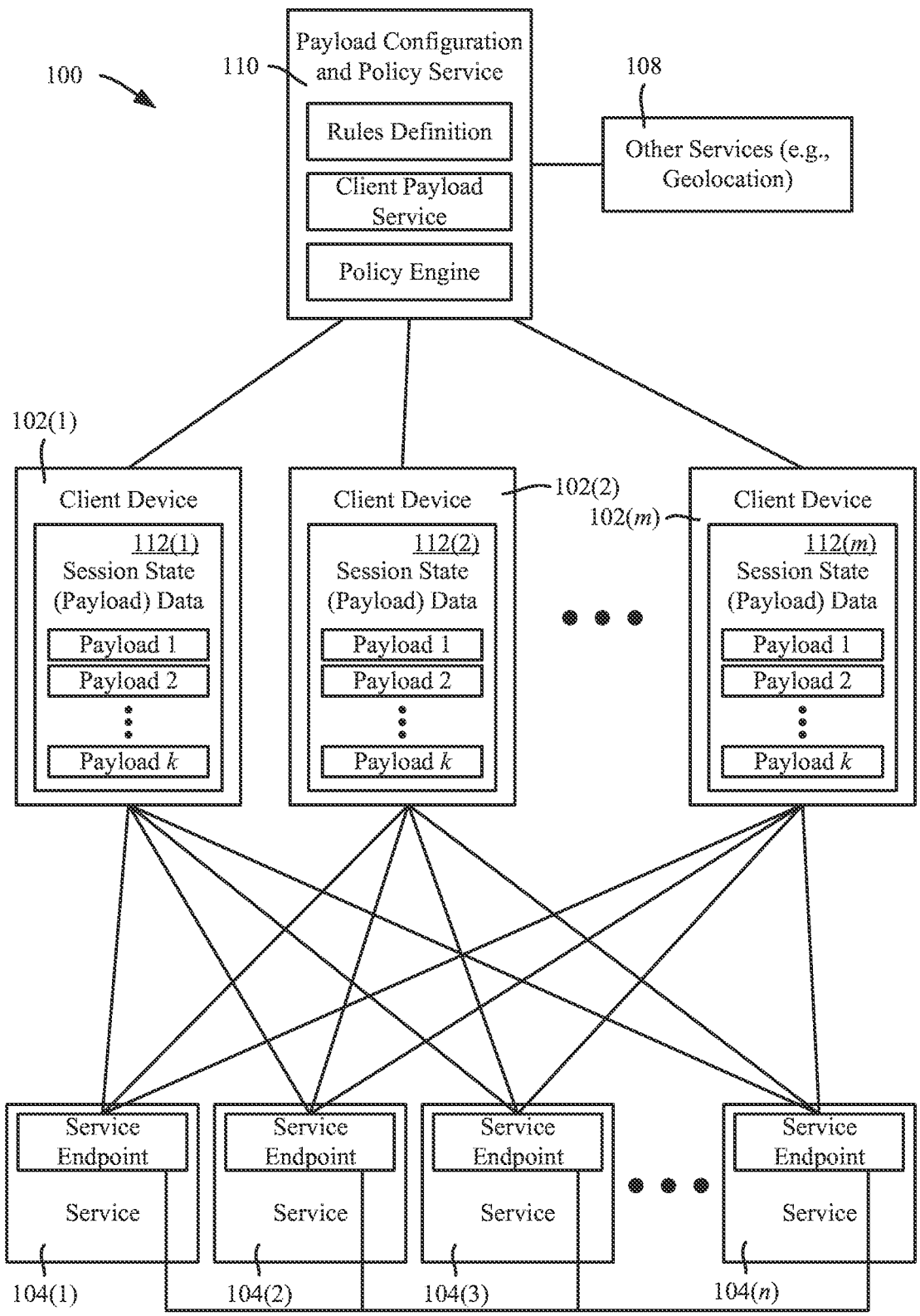
FIG. 1 is an example block diagram representation of a system in which client devices cache session state data, in accordance with various aspects and example implementations of the subject disclosure.

The technology described herein is generally directed towards caching session state data on a client device, and allowing the client to use the session state data when making requests of services. By way of example, consider a call requesting a home page. Such a call may need information from (on the order of) dozens or hundreds of microservices to gather the data to construct the appropriate view. If one such service is expensive or slow, everything is slowed down based on the dependency. The technology described herein stores expensive or repeatedly used data on the client device, so that such data need not be gathered for each call from the client device. Instead, the client device attaches the session state data (which can be only a relevant part thereof) to a request, and the service receiving the request can use that data for calls to other services, avoiding the need to recollect the data for each request.

Thus, once a client device obtains and caches session state data, the session state data can be accessed by any domain within the client application program or the like that couples to the various services of a platform. As one benefit, a partition fault or access latency issue corresponding to any session state variable does not impact availability or consistency of the overall product, as long as the partition itself does not change at that time. Session state caching at the client breaks conventional partitioning and acts as an information source between other domains and the failed or remote partition. Further the technology described herein does not have the high costs of full replication, and indeed actually reduces costs because the cached session state information can be reused by services.

In one implementation, the session state data is divided into different session state data payloads, e.g., per domain groupings. In this way, only a portion of the session state data that is relevant to a communication to a service (a client device request or service-to-service communication related to a session) need be sent with the communication. A payload can be encoded (e.g., cryptographically signed with a key known only to the various services) so that the payload is visible on the client device, yet a service can verify the integrity of the payload before using the data therein. For additional security reasons, if a payload need not be processed by the client, the payload can be encrypted so that the payload is opaque on the client device.

It should be understood that any of the examples herein are non-limiting. For instance, certain partitions and domains are described with respect to a content service provider example; however this is only one non-limiting, possible use of the technology described herein. As another alternative, certain configuration-related data structures are described, including templates, dimension information, route key data, and endpoint data, however other suitable ways and/or structures to maintain and communicate such data can be used.

FIG. 1 is a generalized block diagram representation of an example system 100 in which client devices 102(1)-102(m) are associated with a global platform, such as client devices operated by valid subscribers or other users of a global streaming video content provider/platform. The global platform can comprise services and/or microservices (blocks 104(1)-104(n), 108 and 110) implemented in various servers including cloud services or the like located worldwide.

Each client device 102(1)-102(m) has respective session state data 112(1)-112(k). In general, the session state data can be arranged as separate payload datasets, each dataset associated with a respective service endpoint. Thus, in one implementation and as described herein, session state data is cached on the client as individual session state payload datasets. More particularly, session state is partitioned to payloads, each associated with a logical subset of the session state. In an alternative, if it is an endpoint, then session state is some combination of payloads. The session state payload datasets are received from the services as described herein based on current client context information, such as where the client is currently located, the type of client device, user information (e.g., what the client is entitled to receive), client preferences, and so on.

As shown in FIG. 1, the session state payload data (e.g., 112(1)) comprises individual payload datasets, each of which can be visible, encoded or encrypted depending on a desired level of privacy and security for a given payload. Because the platform relies on what a client sends them, to avoid tampering a typical payload is encoded (e.g., signed with a cryptographic signature) and/or encrypted.

The client can send (e.g., attach) a payload (or more than one if appropriate) with a request to a service, and the service can access that payload as needed to perform some operation(s) to respond to the request. The service that receives the client request may communicate with one or more other services as part of the operation(s), which in turn can invoke other service(s), using the payload or some relevant part thereof in the service-to-service communication(s).

With respect to determining the payloads that are appropriate for a given platform, in one implementation payloads are organized generally based on their purpose and usage. In this way, a client device need not always send its entire session state payload data with each request to a service, but only a relevant part (e.g., a single payload dataset) of the session state payload data to the service. Further, if the session state payload data needs to be updated, updates can occur on an individual payload dataset basis rather than the entire session state payload data. In other words, any one of the logical domains can be expired independently and updated; any service in the group of participating services can determine a need to update. The use of individual session state payload datasets reduces the amount of data exchanged among the clients and services.

Figure 2:
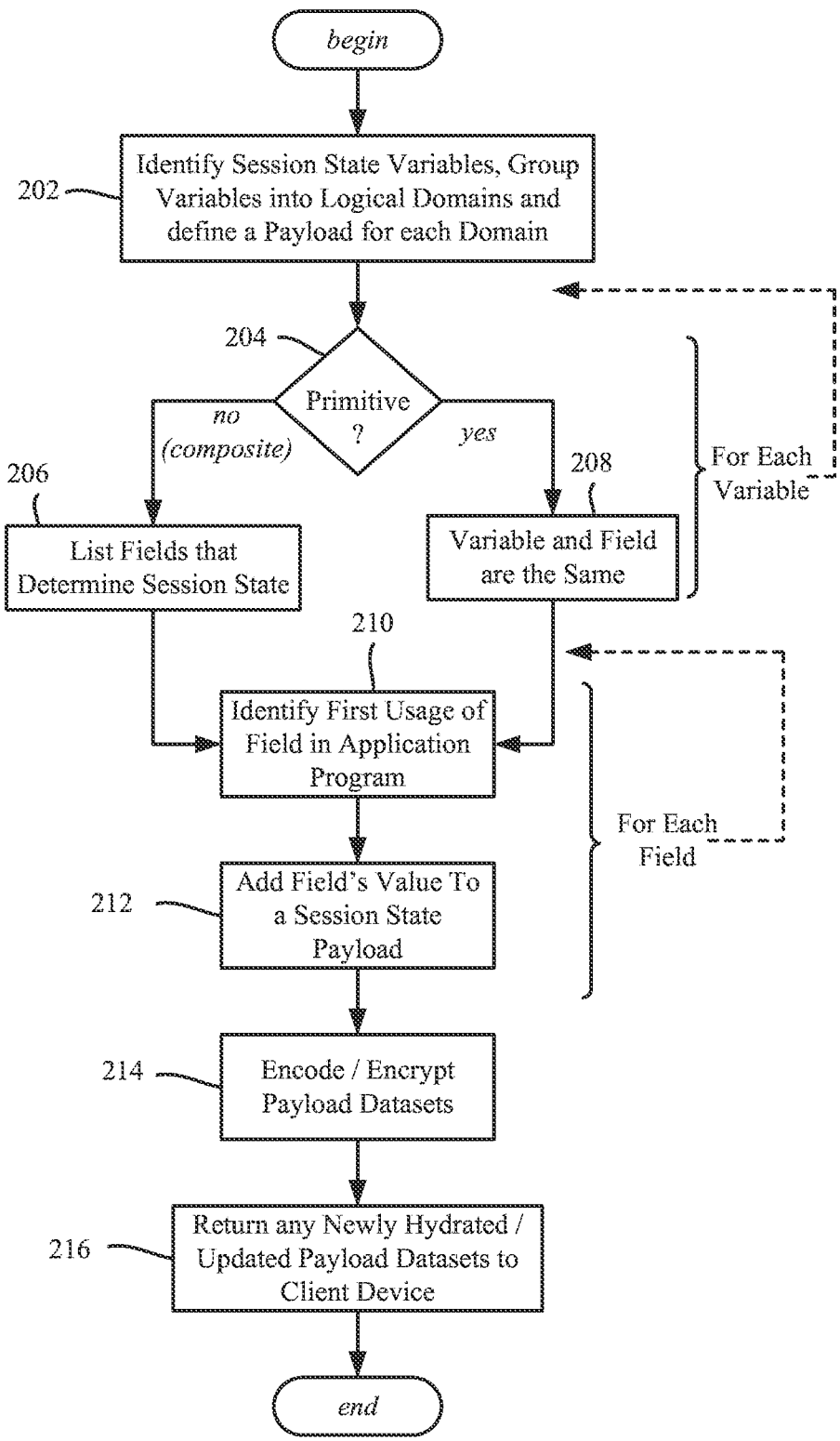
FIG. 2 is a flow diagram of example operations related to session state data as described herein, in accordance with various aspects and example implementations of the subject disclosure.

FIG. 2 shows one example of how payload datasets can be determined for a platform, beginning at operation 202 which identifies the session state variables. For example, for a streaming video platform, variables include content ratings and parental control, catalog, language settings, localization, and so forth. These are grouped into logical domains, with a payload dataset defined for each domain. Note that while payload datasets individually can be domain specific, payload datasets work across domains.

Once the variables are determined and grouped into domains, operations 204, 206 and 208 are performed for the variables. For each variable, the variable is classified (operation 204) as a primitive data type or a composite data types. For the composite data types, the fields that determine session state are listed (operation 206). For example, parental control ratings can be different for TV series and movies, language settings can be a list with a default device language and a regional primary fallback and secondary fallback, and as such are composite type variables. Alternatively, composite data types can be represented as segments in a single field with a clear way (e.g., a delimiter) to identify each field. In contrast, local currency may be just one value like USD (United States dollars), and thus is a primitive type variable. For primitive data types (like currency), the variable and the field are the same (operation 208).

Once the variable fields are determined, operations 210 and 212 are performed for each field. Operation 210 identifies the first place where it is used in the client application program from the time when the user starts the client application program. Note that in one implementation, this is not actually used in the client application program, but rather is attached to subsequent requests. Further note that attention is paid to multiple user workflows and possibly multiple boundary services. Operation 212, performed for each field, adds the value to a session state payload, prior to the first use. This can be done without significantly impacting application start-up latency when the values need to be obtained for the payload datasets that the client device will cache. For example, multiple fields may be hydrated at the same time, and/or lazy initialization can be introduced at the payload level to reduce application start-up latency. The hydration can thus occur on demand, e.g., when a client device application program sends a request to a service without a payload dataset, the service can collect the information and return it with a response, or can occur lazily, e.g., in a background operation before the client device application program actually needs a payload dataset.

Note that operation 214, which is optional, can be performed for security reasons on a per-payload dataset basis. In general and as described herein, if a payload dataset need not be processed by the client, that payload dataset is encrypted. If a payload dataset can be visible to the client, encode that payload dataset.

Operation 216 returns any newly hydrated/updated payload datasets to the client device. If the payload dataset is hydrated on a call from a service as opposed to a call from the client device, a service sends the payload dataset back to the client, e.g., through a call stack or subsequently. Payload datasets can be added to the response header or body.

Note that in the event of multiple parallel calls, each trying to use the same piece of information, there is a dependency graph, which can be used to make the partition-determining call synchronous, with the other calls blocked on the partition selection. The session state can be hydrated on partition selection.

Once the partition is pinned for the client session, the non-partition determining calls can proceed in parallel using the session state hydrated and returned at operation 216. Even if such calls overwrite each other with the session state, this is a non-event as they would get a consistent session state.

As can be seen, the client can attach the applicable hydrated payload datasets to the requests, and the receiving services can use that session state without having to query the services that are the source of truth for the session state. As set forth herein, restricting attached payload datasets to only the applicable ones reduces transmission size.

Optionally, the services can attach hydrated payloads received from the client to subsequent requests to other services. On session refresh or when any of the partition-determining variables change, rehydrate the session state.

In one implementation, service session state payload datasets are named, opaque JSON Web Signature (JWS) blobs that are injected into or extracted from requests to services. The endpoint and domain descriptions supplied by the configuration service can also include an optional array of payload names. Outbound requests from the client to any configured endpoint include any such named datasets. New payloads or payload updates can be returned in the initial session configuration response body, or as JWS tokens, e.g., passed through a private request header in the response from any trusted domain.

The following table contains non-limiting examples of payload information that is generally relevant to a streaming video provider platform:

| Name | Visibility | Contains |
| --- | --- | --- |
| entitlements | opaque | Brand, Territory |
| | | Allowed and Upsell Channels |
| | | Stream/Download limits |
| | | Ratings authority |
| | | Editorial region |
| profile | opaque | Profile ID |
| | | Adult/Child |
| | | Parental Control Settings |
| | | Editorial age group |
| globalization | visible | UI Language |
| | | Format code |
| | | Alternate UI Language |
| telemetry | opaque | Home country |
| | | Session country |
| | | Access Provider details |
| privacy | opaque | Privacy consents: |
| | | Disable data sharing |
| | | Allow functional cookies |
| | | Allow performance cookies |
| | | Allow targeting cookies |

Other datasets can be for user experience presentation data such as session location, age, editorial, and/or experimentation data such as capabilities the user is allowed to access.

Figure 3:
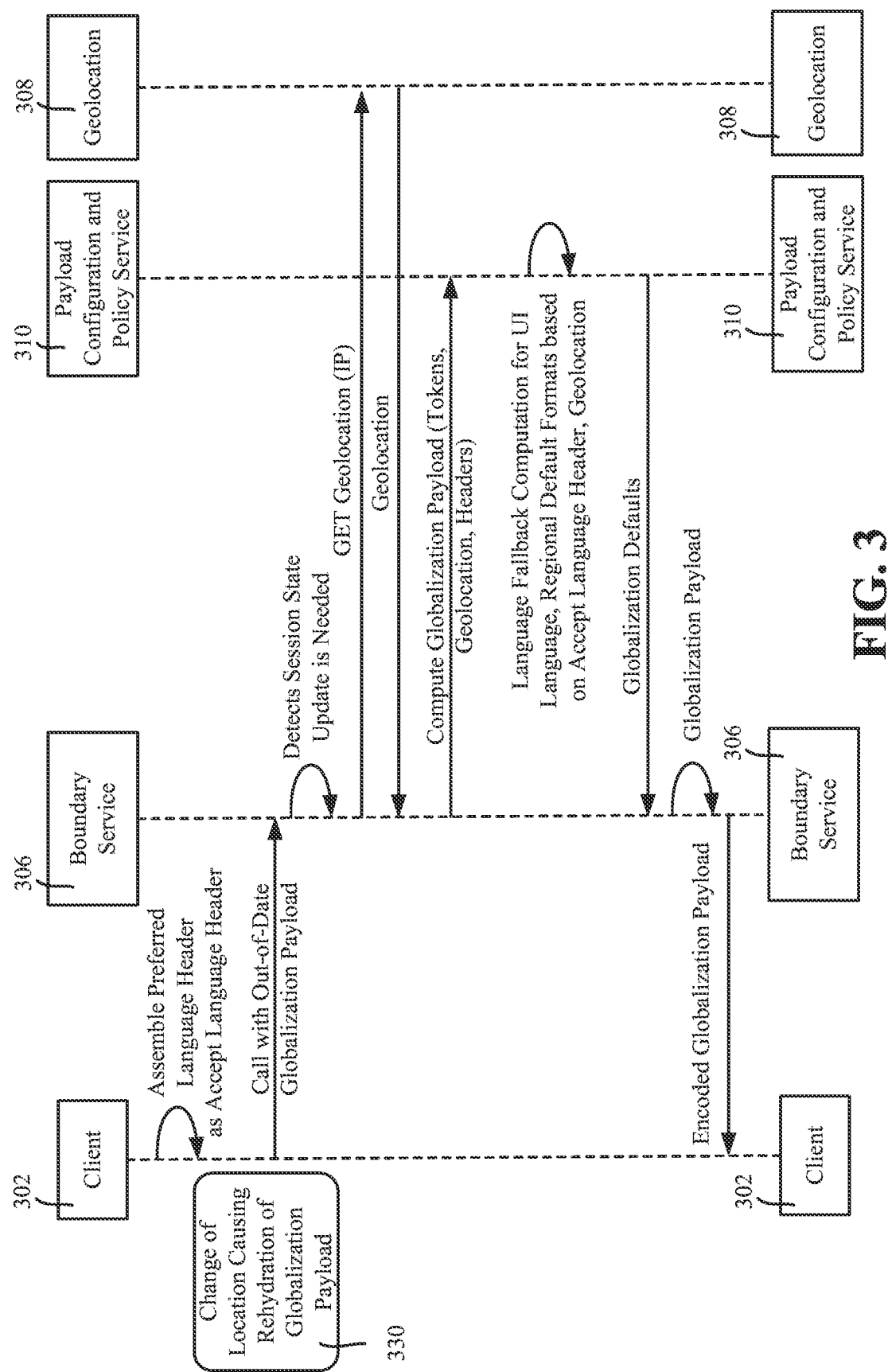
FIG. 3 is a sequence diagram of example communications/dataflow between various services that provide a globalization session state dataset to a client device as described herein, in accordance with various aspects and example implementations of the subject disclosure.

FIG. 3 shows an example of geolocation computation and session state rehydration, such as when a user changes location (block 330), e.g., from a United States region to Canada. In one implementation, the boundary service 306 notices a change in context and triggers a session state rehydration. For example, when the client calls with out-of-date globalization payload (associated with block 330), the boundary service 306 detects that a session state update is needed, e.g., based on the geolocation change; (in an alternative implementation, it is feasible that the client device 302, which has assembled a preferred language header as an accept language header, can trigger a session state rehydration upon the relocation). In any event, not all of the data needs to be rehydrated, e.g., the user is the same, just the location-related dataset(s) are involved. As shown in FIG. 3, a boundary service (or other client-facing service) 306 communicates with a geolocation service 308 (corresponding to block 108 in FIG. 1) to determine the user's current location.

The boundary service receives the geolocation data, and sends that information and other data to a payload configuration and policy service 310 (corresponding to block 110 in FIG. 1), which in turn computes globalization default data for returning to the boundary service 306. Based on this globalization data, the boundary service 306 hydrates the globalization payload and returns the globalization payload dataset back to the client device 302. The globalization payload can correspond to session language, currency formats, date time formats, and the like.

Note that payload datasets visible to the client (e.g., globalization) are encoded at the boundary. Opaque payloads (e.g., profiles, entitlements, telemetry, privacy) are encrypted at the boundary.

Figure 4:
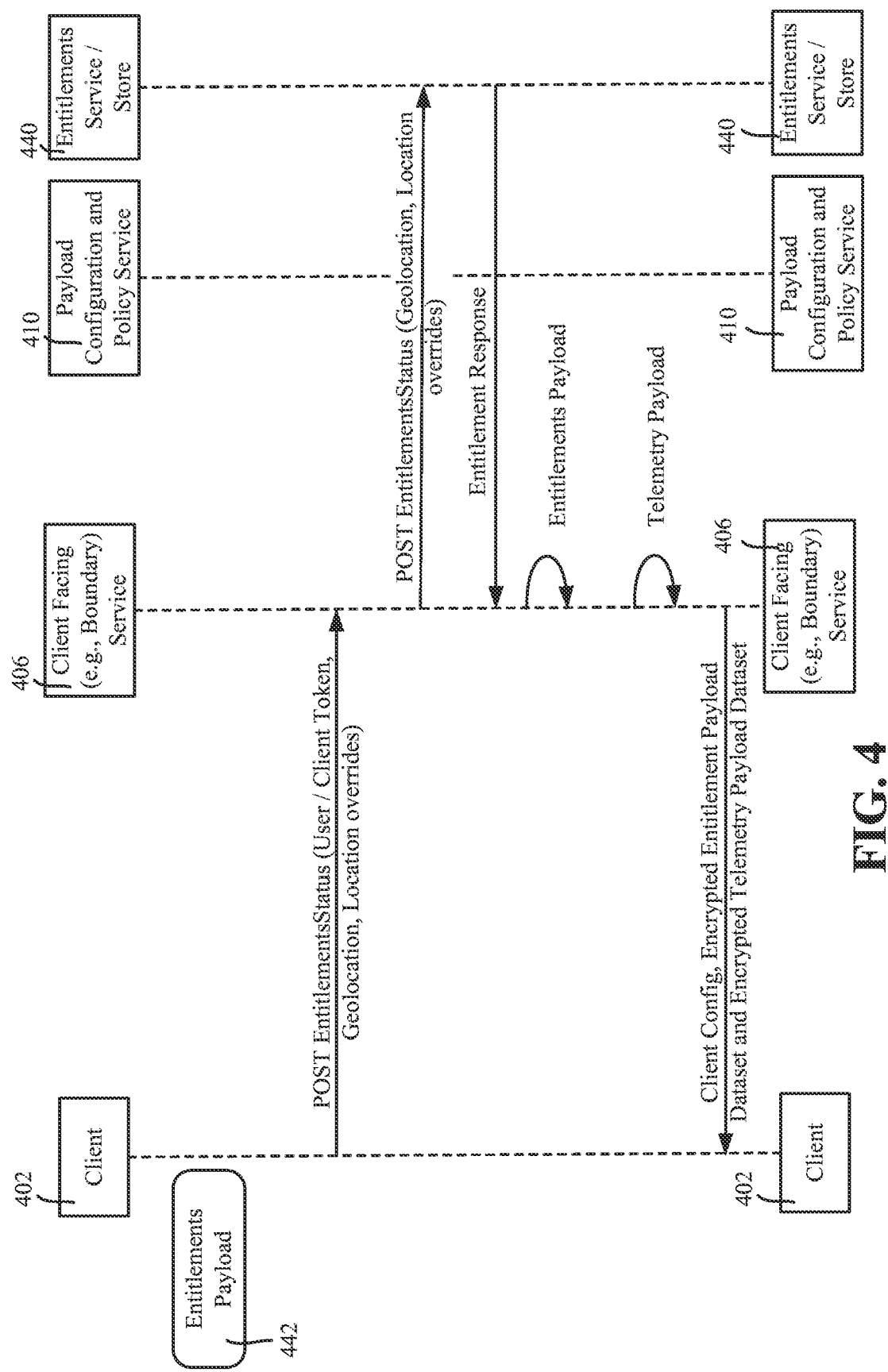
FIG. 4 is a sequence diagram of example communications/dataflow between various services that provide an entitlement session state payload dataset and telemetry session state payload dataset to a client device as described herein, in accordance with various aspects and example implementations of the subject disclosure.
Figure 5:
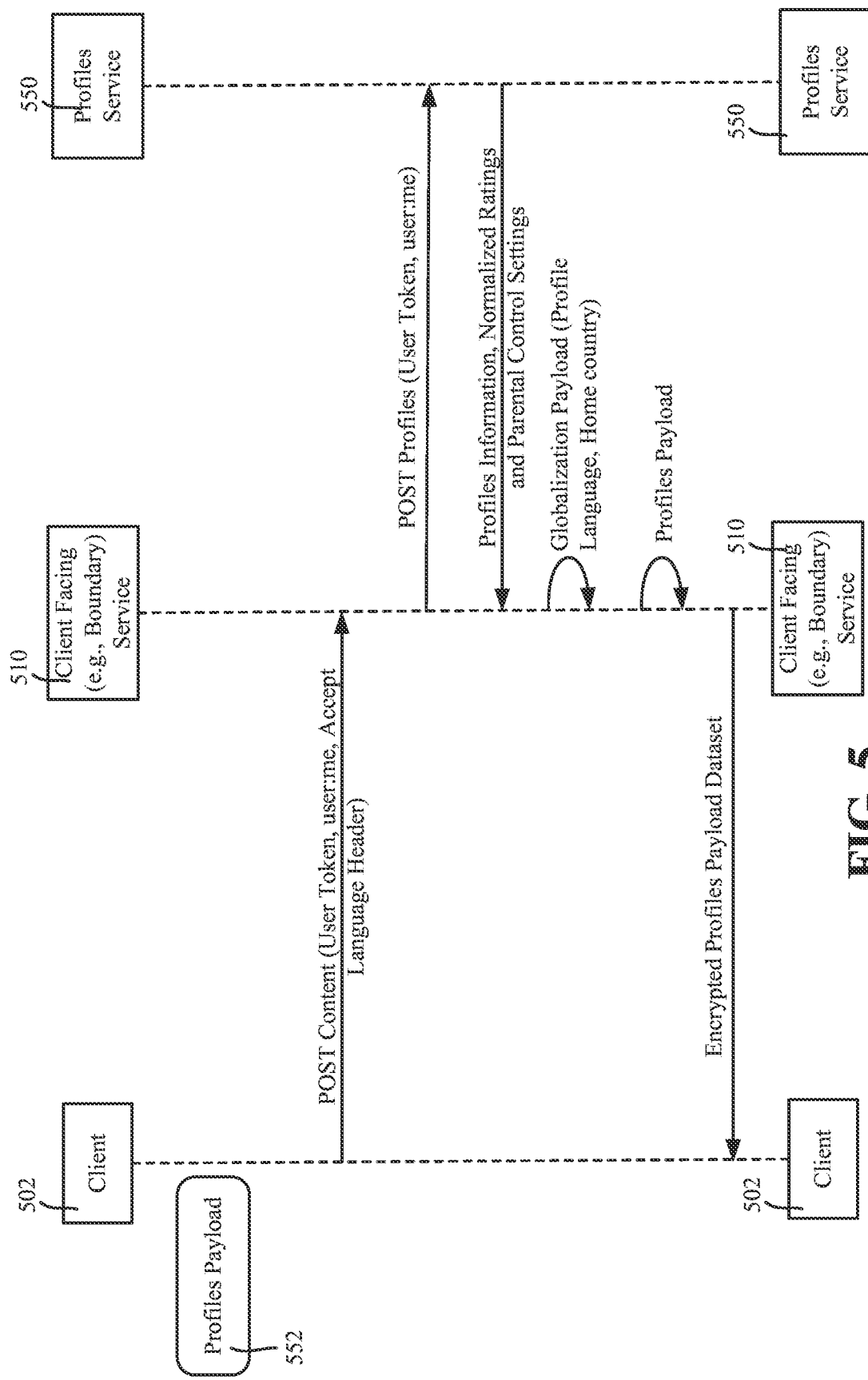
FIG. 5 is a sequence diagram of example communications/dataflow between various services that provide a profiles session state payload dataset to a client device as described herein, in accordance with various aspects and example implementations of the subject disclosure.
Figure 6:
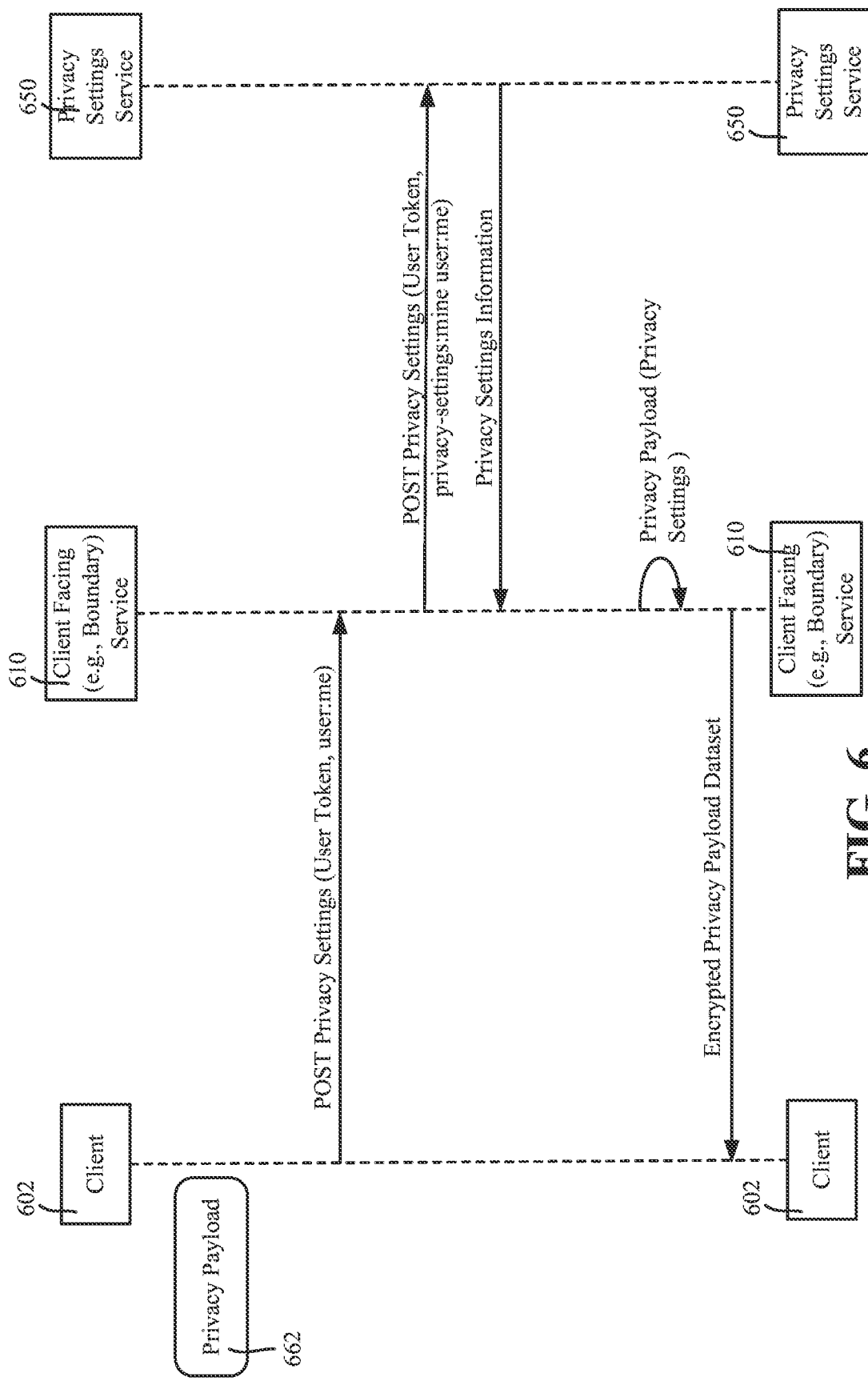
FIG. 6 is a sequence diagram of example communications/dataflow between various services that provide a privacy session state payload dataset to a client device as described herein, in accordance with various aspects and example implementations of the subject disclosure.

FIGS. 4-6 show some examples of sequence and dataflow operations for obtaining certain datasets. As will be understood, other datasets can be similarly obtained, and are not separately shown for purposes of brevity.

FIG. 4 shows an example of an encrypted entitlements payload dataset obtained from an entitlements service 440 for an unauthenticated or authenticated user client 402, and a telemetry payload dataset; such payload datasets are asynchronously loaded based on entitlements data need (block 442). Note that entitlements can be linked to an unauthenticated state, that is, for an unauthenticated user, the entitlements payload can be synchronously populated to allow local catalog browsing and a limited free experience. The globalization payload and language negotiation are also used to ensure the user interface is rendered in the correct language.

For the authenticated user, the entitlements payload dataset and profiles payload dataset are populated as part of the sign-in workflow. Note that content entitlements are distinct from video capabilities data, such as number of concurrent streams, limits on device type (for example, mobile only), limits on number of devices and so forth. Further note that the globalization payload dataset needs to be updated if the user's preferences do not match the current localization settings.

FIG. 5 shows a profiles payload sequence/dataflow, for authenticated users only, obtained as a profiles payload dataset from a profiles service 550 upon the need for profiles data (block 552). Note that a prerequisite is that the client has received a valid entitlements payload dataset (FIG. 4). The profiles payload dataset is encrypted at the boundary.

FIG. 6 shows a privacy payload sequence/dataflow, for authenticated users only, obtained as a privacy payload dataset from a profiles service 660 upon the need for privacy data (block 662). The privacy payload dataset is encrypted at the boundary. The privacy payload is asynchronously updated, if there are stored settings in the account.

Figure 7:
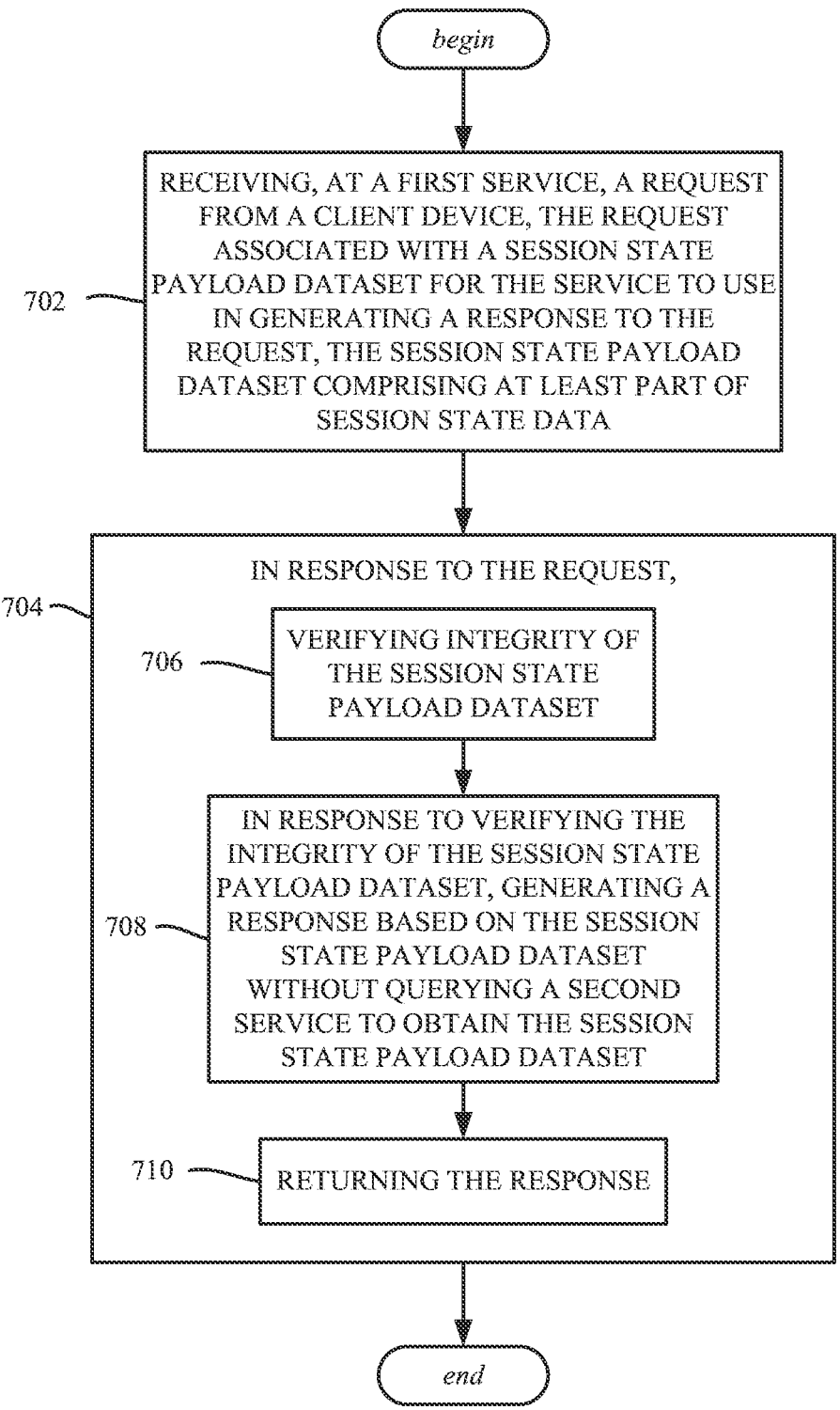
FIG. 7 is a flow diagram of example operations related to responding to a client device based on a session state payload dataset received from the client device, in accordance with various aspects and example implementations of the subject disclosure.

One or more aspects can be embodied in a system, such as represented in FIG. 7, and for example can comprise a memory that stores computer executable components/instructions, and a processor that executes computer executable components/instructions stored in the memory to perform operations. Example operations can comprise operation 702, which represents receiving, at a first service, a request from a client device, the request associated with a session state payload dataset for the service to use in generating a response to the request, the session state payload dataset comprising at least part of session state data. Operation 704 represents, in response to the request, verifying integrity of the session state payload dataset (operation 706), in response to verifying the integrity of the session state payload dataset, generating a response based on the session state payload dataset without querying a second service to obtain the session state payload dataset (operation 708), and returning the response (operation 710).

The first service can be or can include a microservice.

The session state payload dataset can include at least one of: user preference data, user profile data, content data, privacy data, globalization data, video capability data, user experience presentation data, experimentation data, or entitlement data.

The session state payload dataset can include at least one of: client device data or telemetry data.

Verifying the integrity of the session state payload dataset can include verifying the session state payload dataset is correctly signed and encoded.

At least part of the session state data can include an encrypted session state payload dataset, and verifying the integrity of the session state payload dataset can include decrypting the encrypted session state payload dataset.

Further operations can include encrypting at least part of the session state data for caching as an encrypted session state payload dataset on the client device.

Further operations can include grouping the session state data into logical domains corresponding to session state payload datasets, and wherein the session state payload datasets data work across at least two of the logical domains.

Further operations can include determining that at least part of the session state payload dataset has changed, and in response to the determining, updating the session state payload dataset into an updated session state payload dataset for caching on the client device.

Further operations can include attaching the session state payload dataset to a communication with a third service, wherein the communication with the third service is from the client device, or wherein the communication with the third service is from another service.

Figure 8:
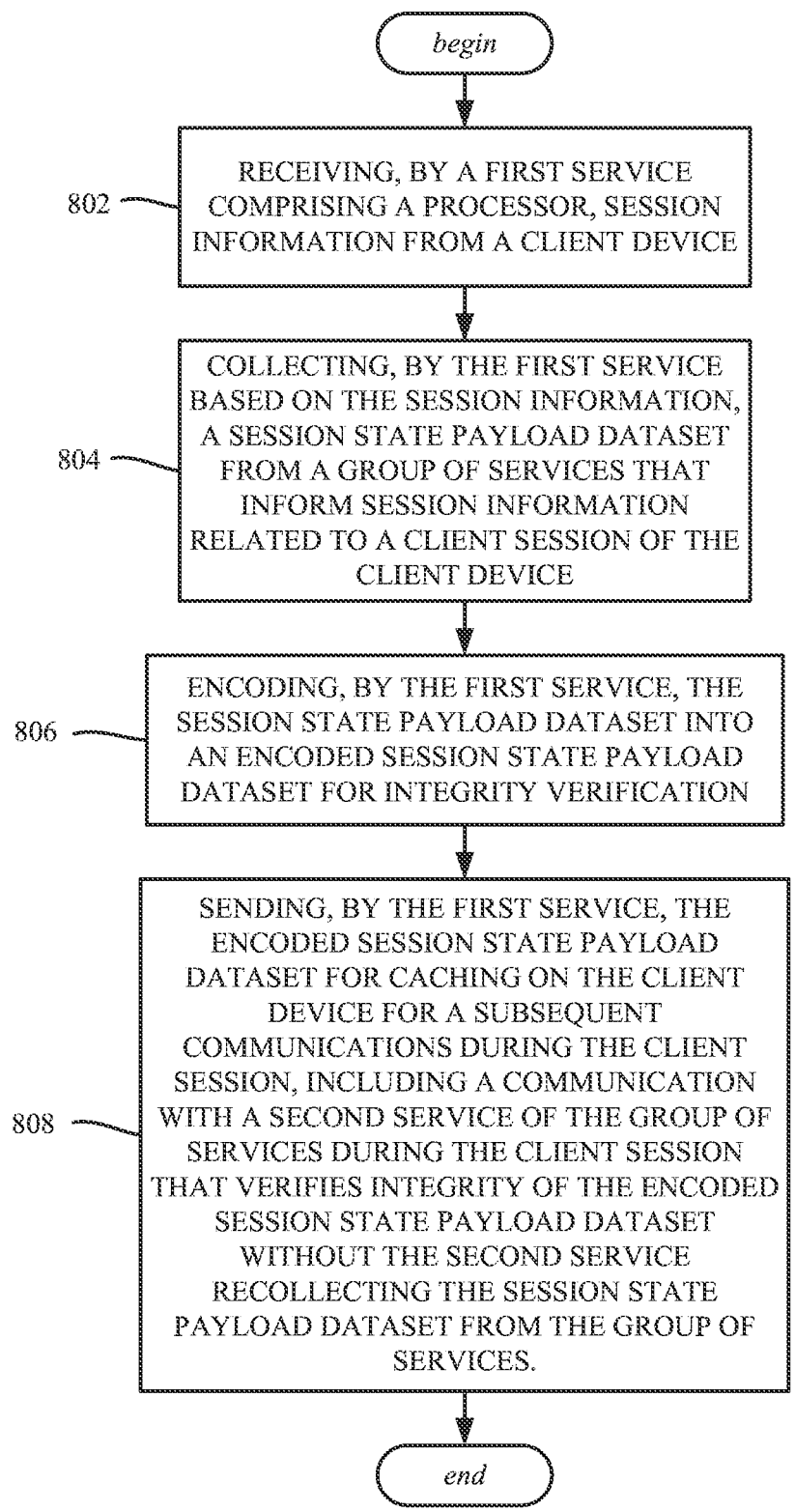
FIG. 8 is a flow diagram of sending a session state payload dataset to a client device, in accordance with various aspects and example implementations of the subject disclosure.

One or more example aspects, such as corresponding to operations of a method, are represented in FIG. 8. Operation 802 represents receiving, by a first service comprising a processor, session information from a client device. Operation 804 represents collecting, by the first service based on the session information, a session state payload dataset from a group of services that inform session information related to a client session of the client device. Operation 806 represents encoding, by the first service, the session state payload dataset into an encoded session state payload dataset for integrity verification. Operation 808 represents sending, by the first service, the encoded session state payload dataset for caching on the client device for a subsequent communications during the client session, including a communication with a second service of the group of services during the client session that verifies integrity of the encoded session state payload dataset without the second service recollecting the session state payload dataset from the group of services.

Encoding the session state payload dataset can include signing the encoded session state payload dataset.

Encoding the session state payload dataset can include signing the encoded session state payload data with an object notation web signature.

The session state payload dataset can be a first session state payload dataset, and operations can include encrypting a second session state payload dataset for caching as an encrypted session state payload dataset on the client device.

Variables of the session state payload dataset can be grouped based on a logical domain.

Operations can include determining that the session state payload dataset has changed, and in response, updating the session state payload dataset into an updated session state payload dataset for caching on the client device.

The session information can be first session information, the client device can be a first client device, the session state payload dataset can be a first session state payload dataset, the encoded session state payload dataset can be a first encoded session state payload dataset, the communication with the second service can be a first communication, and operations can include receiving, by the first service, second session information associated with a second client device, collecting, based on the second session information, a second session state payload dataset from the group of services that manage session information related to a second client session of the second client device, encoding the second session state payload dataset into second encoded session state payload dataset for integrity verification, and sending, by the first service or the first client device, the second encoded session state payload dataset for caching on the second client device for subsequent communications during the second client session, including a second communication with the second service of the group of services during the second client session that verifies integrity of the second encoded session state payload dataset without the second service recollecting the second session state payload dataset from the group of services.

Figure 9:
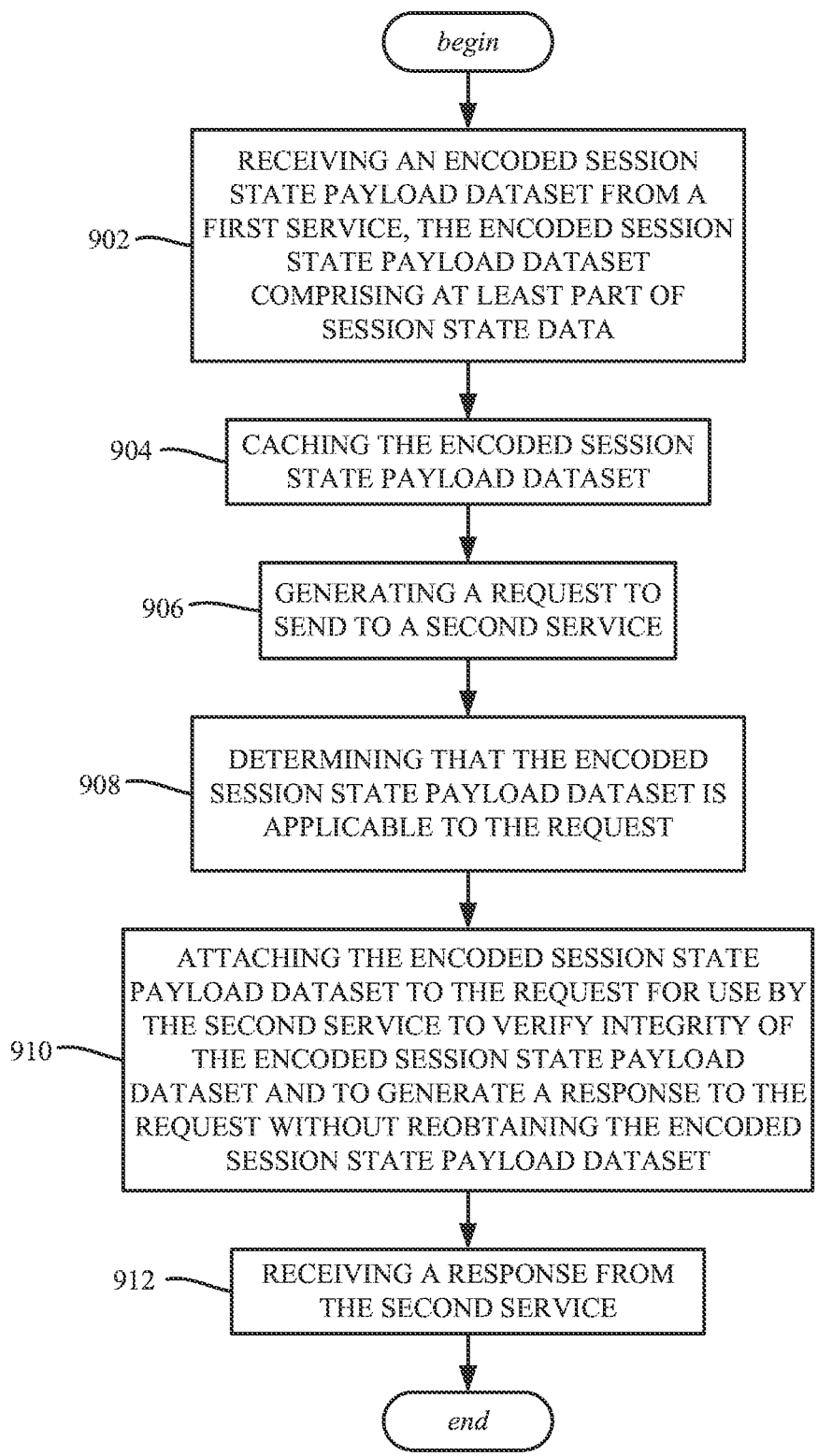
FIG. 9 is a flow diagram of example operations related to a client device attaching a session state payload dataset to a request made to a service, in accordance with various aspects and example implementations of the subject disclosure.

FIG. 9 summarizes various example operations, e.g., corresponding to executable instructions of a machine-readable medium, in which the executable instructions, when executed by a processor, facilitate performance of the example operations. Operation 902 represents receiving an encoded session state payload dataset from a first service, the encoded session state payload dataset comprising at least part of session state data. Operation 904 represents caching the encoded session state payload dataset. Operation 906 represents generating a request to send to a second service. Operation 908 represents determining that the encoded session state payload dataset is applicable to the request. Operation 910 represents attaching the encoded session state payload dataset to the request for use by the second service to verify integrity of the encoded session state payload dataset and to generate a response to the request without reobtaining the encoded session state payload dataset. Operation 912 represents receiving a response from the second service.

The request can be a first request, the encoded session state payload dataset can be a first encoded session state payload dataset, the response can be a first response, and further operations can include generating a second request to send to a third service, determining a second encoded session state payload dataset that is applicable to the second request, attaching the second encoded session state payload dataset for use by the third service to verify integrity of the second encoded session state payload dataset and to generate a second response to the second request without reobtaining the encoded session state payload dataset, and receiving the second response from the third service.

Note that for certain conditions, such as when one device is coupled to another for presenting content, the flow can be from client A to client B to a service (exchange client A payload to client B payload). Cross domain logic can be applied to ensure proper security measures are in place as the session continues.

The encoded session state payload dataset can be a first encoded session state payload dataset, and further operations can include receiving a second encoded session state payload dataset, and caching the second encoded session state payload dataset for attaching to subsequent communications instead of attaching the first encoded session state payload dataset.

As can be seen, there is described a technology in which a cached session state can be used by a client device for access by any domain within a product comprising a client application program that couples to a service platform or the like. As one benefit, a partition fault or access latency corresponding to any session state variable does not impact availability or consistency of the client application program, as long as the partition itself does not change at that time. Such caching breaks conventional partitioning and acts to couple each domain with other domains and the failed or remote partition.

Further, the technology described herein avoids the high costs of full replication, and indeed reduces costs because the cached information can be reused by services. The technology effectively decouples the different service domains within the product using the cached distributed session state information, reduces network traffic through cached payloads, and reduces latency experienced by the user by reducing the calls to and among services. The technology described herein effectively ensures a consistent and good user experience while maintaining a certain deployment architecture for global privacy and compliance, reduces communication between services and thereby reduces cloud infrastructure network and scaling costs, while increasing partition fault tolerance during a session (provided the partition does not change during the time of the failure). This is done with no negative impact to availability or consistency.

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 10 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
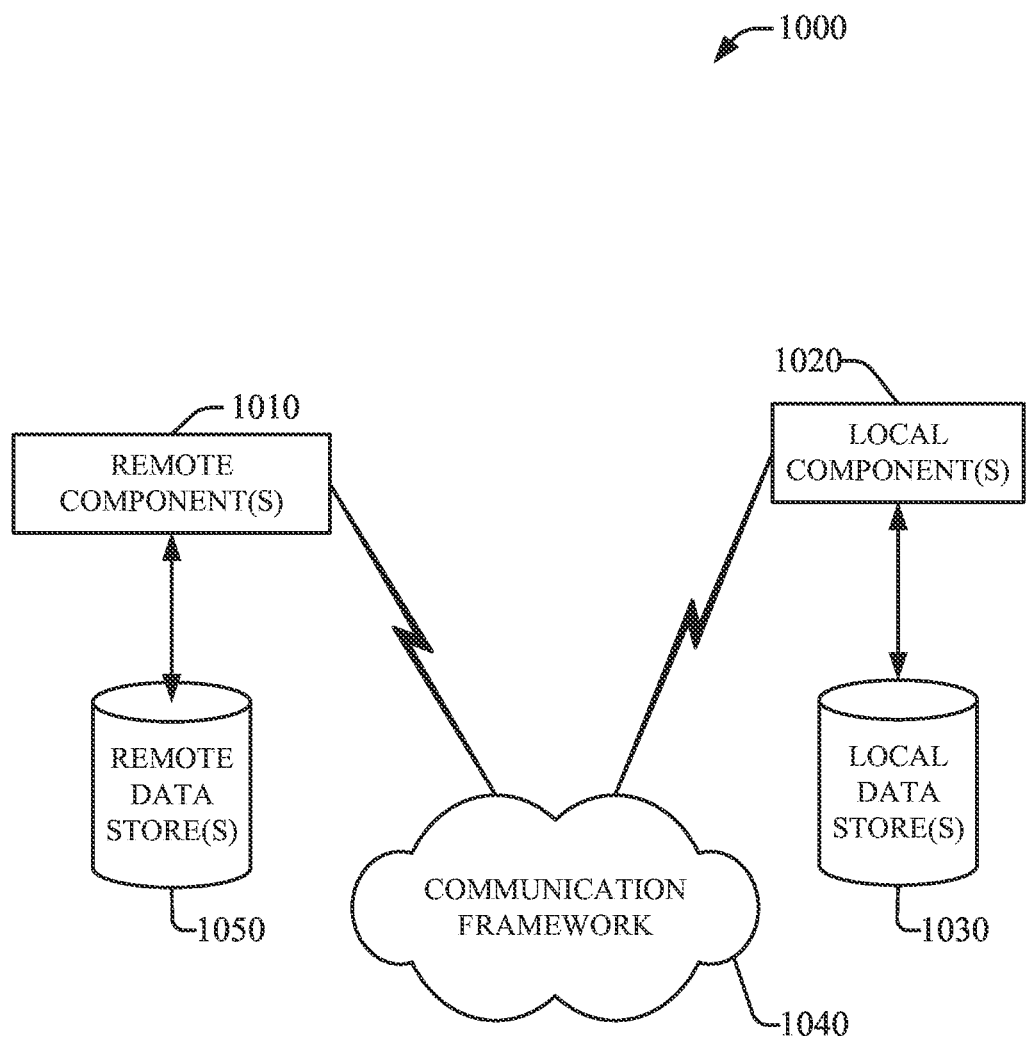
FIG. 10 is a block diagram representing an example computing environment into which aspects of the subject matter described herein may be incorporated.

FIG. 10 thus illustrates a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
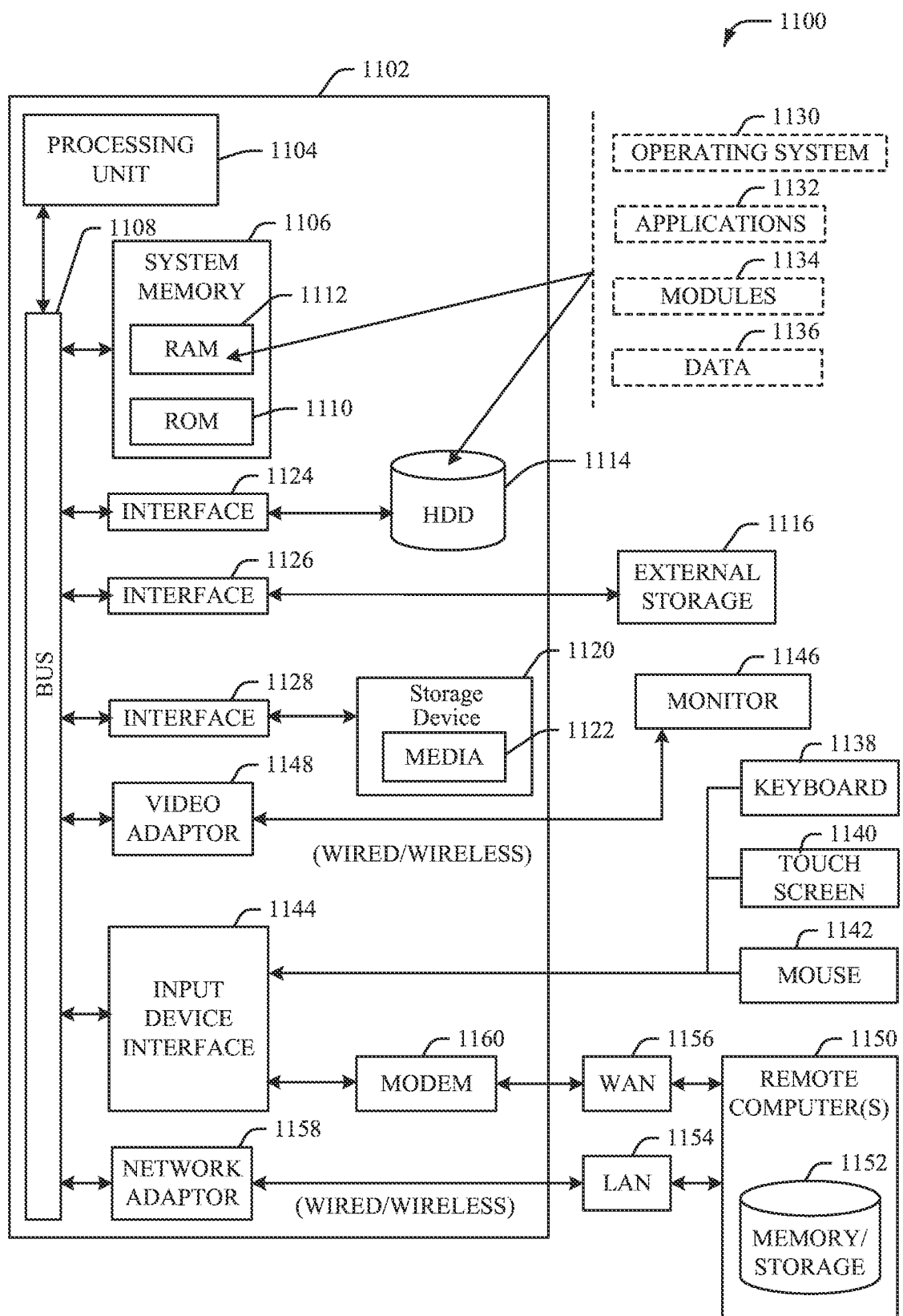
FIG. 11 depicts an example schematic block diagram of a computing environment with which the disclosed subject matter can interact, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
a processor; and
a memory that stores executable instructions that, when executed by the processor of the system, facilitate performance of operations, the operations comprising:
generating, by a first service, a security layer for a hydrated payload dataset associated with a session state payload dataset, and applying the security layer to the hydrated payload dataset resulting in a secured payload dataset,
sending, by the first service, for caching at a client device, the secured payload dataset,
obtaining, by a receiving service comprising the second service or the first service, a request from the client device, wherein the request is associated with the session state payload dataset and comprises the secured payload dataset for the receiving service to use in generating a response to the request,
wherein the obtaining is performed absent querying of a service other than the receiving service,
in response to obtaining the request, verifying, by the receiving service, and based on the security layer, integrity of the secured payload dataset,
in response to verifying the integrity of the secured payload dataset, generating, by the receiving service, the response based on the secured payload dataset, and
returning the response to the client device.

2. The system of claim 1, wherein the first service and the second service each comprise a microservice.

3. The system of claim 1, wherein the session state payload dataset comprises at least one of user preference data, user profile data, content data, privacy data, globalization data, video capability data, user experience presentation data, experimentation data, entitlement data, client device data or telemetry data.

4. The system of claim 1, wherein the verifying the integrity of the secured payload dataset comprises verifying the secured payload dataset is correctly signed and encoded.

5. The system of claim 1, wherein at least part of the state secured data comprises an encrypted payload dataset, and wherein the verifying the integrity of the secured payload dataset comprises decrypting the encrypted payload dataset.

6. The system of claim 1, wherein the securing comprises encrypting the hydrated payload dataset for the sending for being cached as an encrypted payload dataset, being the secured payload dataset, at the client device.

7. The system of claim 1, wherein the operations further comprise:
grouping session state data of the session state payload dataset into logical domains of the session state payload dataset and corresponding to plural payload datasets, including a payload dataset resulting in the secured payload dataset, and wherein individual ones of the plural payload datasets work across at least two of the logical domains.

8. The system of claim 1, wherein the operations further comprise:
determining that at least a part of the session state payload dataset has changed, wherein the part corresponds to the secured payload dataset, and in response to the determining, updating the secured payload dataset into an updated secured payload dataset for the caching at the client device.

9. The system of claim 1, wherein the operations further comprise:
attaching the secured payload dataset to a communication with a third service absent querying of a service other than the receiving service, wherein the communication with the third service is based on the request from the client device, or wherein the communication with the third service is based on a request from a fourth service.

10. The system of claim 1, wherein the operations further comprise:
prior to generating the security layer, hydrating a payload dataset obtained from the client device, resulting in the hydrated payload dataset,
wherein the hydrating the payload dataset comprises hydrating multiple fields of the payload dataset.

11. The system of claim 1,
wherein the generating the security layer comprises encoding data of the hydrated payload dataset, resulting in enabled decoding of the secured payload dataset by the client device, or
wherein the generating the security layer comprises encrypting data of the hydrated payload dataset, resulting in non-enabled decryption of the secured payload dataset by the client device.

12. A method, comprising:
obtaining, by a first service comprising a processor, session information from a client device;
collecting, by the first service, and based on the session information, a payload dataset from a group of services that that inform session information related to a client session of the client device;
hydrating, by the first service, a field of the payload dataset;
securing, by the first service, the hydrated session state payload dataset into a secured payload dataset for integrity verification,
wherein the securing is performed by generating and applying, by the first service, a security layer for the hydrated payload dataset of the session information, resulting in the secured payload dataset; and
sending, by the first service, the secured payload dataset for being cached at the client device for a subsequent communications during the client session,
wherein the subsequent communications include a communication with a second service of the group of services, during the client session, based on a request from the client device comprising the secured payload dataset, wherein the second service verifies integrity of the secured payload dataset, based on the security layer, without the second service recollecting the secured payload dataset from the group of services, and wherein the second service sends a response to the request to the client device based on the secured payload dataset.

13. The method of claim 12, wherein the securing the payload dataset comprises signing the payload dataset.

14. The method of claim 12, wherein the payload dataset is a first payload dataset, and wherein the method further comprises securing a second payload dataset for sending for being cached as a second secured payload dataset on the client device, wherein the securing the second payload dataset comprises encrypting the second payload dataset, resulting in non-enabled decryption of the second secured payload dataset by the client device.

15. The method of claim 12, wherein variables of the payload dataset are grouped based on a logical domain.

16. The method of claim 12, further comprising:
determining, by the second service, that data of the session information has changed, and in response to the determining, updating the secured payload dataset into an updated secured payload dataset for sending for being cached at the client device.

17. The method of claim 12, wherein the secured payload dataset functions at plural logical domains of the session information.

18. A non-transitory machine-readable medium, comprising executable instructions that, when executed by a processor, facilitate performance of operations, the operations comprising:
sending to a first service, by a client device comprising a processor, a payload dataset comprising at least a part of session state data of session information;
receiving, by the client device, an encoded and hydrated version of the payload dataset, being an encoded payload dataset having an encoding at a boundary layer of the payload dataset, from the first service;
caching, by the client device, the encoded payload dataset;
accessing, by the client device, the security layer at a boundary of the encoded payload dataset to thereby enable access to data of the encoded payload dataset;
determining, by the client device, based on the decoding, that the encoded payload dataset is applicable to the request;
generating, by the client device, a request to send to a second service for additional information;
attaching, by the client device, the encoded payload dataset to the request for use by the second service to verify integrity of the encoded payload dataset and to generate a response to the request without reobtaining the encoded payload dataset; and
receiving, by the client device, the response from the second service, the response comprising the additional information.

19. The non-transitory machine-readable medium of claim 18, wherein the request is a first request, wherein the encoded payload dataset is a first encoded payload dataset, wherein the response is a first response, and wherein the operations further comprise generating a second request to send to a third service, determining a second encoded payload dataset based on the session information and that is applicable to the second request, attaching the second encoded payload dataset for use by the third service to verify integrity of the second encoded payload dataset and to generate a second response to the second request without reobtaining the second encoded payload dataset, and receiving the second response from the third service.

20. The non-transitory machine-readable medium of claim 18, wherein the encoded payload dataset is a first encoded payload dataset, and wherein the operations further comprise receiving a second encoded payload dataset, and caching the second encoded payload dataset for attaching to subsequent communications instead of attaching the first encoded payload dataset.

* * * * *